3,005,019
DIHYDROMERCENYL MONOACETATE
Garry C. Kitchens, Packanack Lake, N.J., assignor to The Givaudan Corporation, New York, N.Y., a corporation of New Jersey
No Drawing. Filed Oct. 7, 1957, Ser. No. 688,420
3 Claims. (Cl. 260—489)

The present invention relates to derivatives of dihydromyrcene and to a process for manufacturing the same. More specifically, the invention relates to a novel process for preparing derivatives from dihydromyrcene by selecting favorable reaction conditions and to novel compositions obtained by said process. In a more special aspect, the invention relates to a technically simple, commercially feasible process for making synthetically products having olfactory properties superior in many respects to those of their more costly natural counterparts.

In accordance with the present invention, the aforesaid derivatives are synthesized by hydrogenation of myrcene to obtain dihydromyrcene, epoxidation, and at least one reaction selected from the group consisting of hydroxylation and acetylation. By proper selection of the reactions and the reaction conditions, such derivatives of dihydromyrcene as α-hydroxytetrahydromercenyl acetate, dihydromyrcenyl monoacetate, and dihydromyrcenyl diacetate may be obtained.

The initial material according to the present invention is myrcene, an olefinic terpene obtainable by pyrolysis of beta-pinene. Myrcene No. 85, supplied by Glidden Co., Jacksonville, Florida, has been found satisfactory.

The aforementioned myrcene may be hydrogenated to dihydromyrcene, for example, in the presence of Raney nickel, using hydrogen gas. Distillation of either the crude myrcene or the dihydromyrcene has been found advantageous.

Because myrcene exists in two forms (the isopropenyl form and the isopropylidene form), and because both 1, 4 and 1, 2 addition of hydrogen occurs to the conjugated system, the dihydromyrcene, as obtained herein, is a mixture of isomers in which the double bonds occupy different positions. This is shown by the following reaction schemes.

Although the first isomer derived from the isopropylidene form of myrcene is used in illustrating the present invention, it will be appreciated by one skilled in the art, after familiarizing himself with the present invention, that isomerization of terminal double bonds is possible even in the derivatives prepared in the manner described herein.

Advantageous epoxidation can be obtained by reacting at low temperature a convenient quantity, for example, 1 mol of dihydromyrcene, with from about 0.9 mol to about 1.0 mol of 30% hydrogen peroxide stabilized with sulfuric acid in the presence of from about 1 mol to about 6 mols of formic acid or acetic acid.

The temperature during epoxidation may be from about 20° C. to about 40° C., depending chiefly upon the concentration of peroxide.

The epoxytetrahydromyrcene is the intermediate product used according to the present invention and is formed in situ in preparing the aforementioned derivatives of dihydromyrcene. By selecting suitable reagents and favorable reaction conditions, it is possible to convert the epoxytetrahydromyrcene to a hydroxyester, to a diester, or to a monoester.

Thus, to prepare hydroxytetrahydromyrcene acetate, I select expoxidation and hydroxylation-acetylation as the reactions. The two reactions are carried out concurrently. In accordance with the invention, a convenient quantity, such as 1 mol of dihydromyrcene, dissolved in an equal quantity of a hydrocarbon such as benzene is reacted with about 0.9 mol to about 1.0 mol of 30% hydrogen peroxide (stabilized with sulfuric acid) in the presence of from 1 to 6 mols of acetic acid at reflux, while removing water azeotropically. A small amount of sodium acetate is added to neutralize the sulfuric acid from the peroxide. The solvent is distilled off at reduced pressure, leaving crude hydroxytetrahydromyrcenyl acetate, which may be purified by fractional distillation.

To prepare tetrahydromyrcenyl diacetate, I select epoxidation and hydroxylation-acetylation as the reactions. More than one sequence of reactions is available for this purpose. For example, epoxidation, hydroxylation-acetylation may be conducted concurrently to obtain the hydroxy ester, which may then be acetylated to the diester.

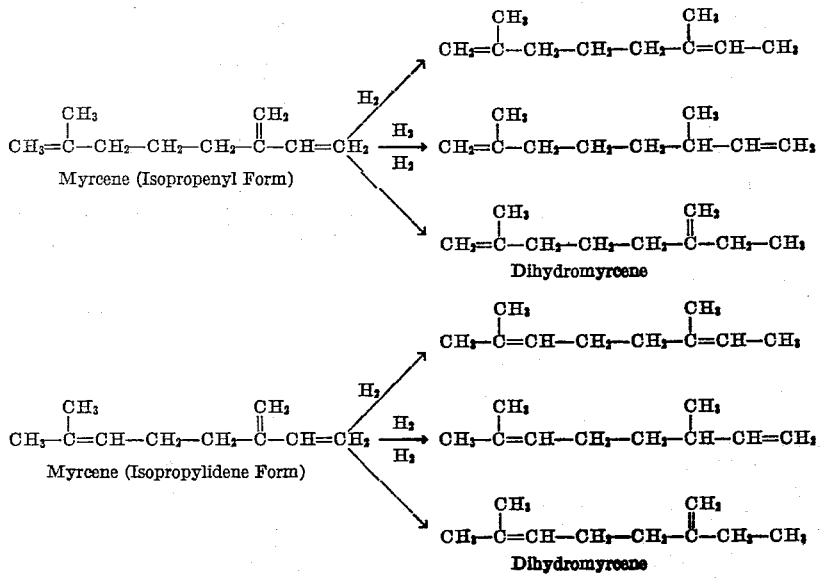

Alternatively, if hydroxylation only is selected as the initial reaction of the epoxytetrahydromyrcene, a glycol may be obtained. This glycol may be acetylated to the diester. Both of the aforementioned reaction sequences have been found satisfactory methods for preparing the diester.

A convenient quantity, for example 1 mol, of hydroxytetrahydromyrcenyl acetate crude is mixed with from about 1 mol to about 2 mols of acetic anhydride and the batch heated to from about 100° C. to about 120° C. for from about 6 hours to about 24 hours. The course of the reaction can be followed by determining the saponification value of samples withdrawn at intervals.

A minor proportion of sodium acetate is added, and the acetic anhydride-acetic acid is distilled at reduced pressure. The crude diacetate may be purified by fractional distillation under vacuum.

According to the alternative process a quantity, such as 1 mol, of dihydromyrcene is reacted with from about 1 mol to about 3 mols of acetic acid, a minor amount of concentrated sulfuric acid, and from about 0.9 mol to about 1.0 mol of 90% $H_2O_2$ at from about 20° C. to about 40° C. for from about 12 hours to about 48 hours. A minor quantity of sodium acetate is added and the batch agitated at from about 60° C. to about 80° C. for about two hours. The acetic acid is distilled off under reduced pressure. From about 1.0 mol to about 1.5 mol of acetic anhydride is then added and the reaction mix is heated at from about 100° C. to about 120° C. for from about 6 hours to about 18 hours. The acetic acid-acetic anhydride mixture is distilled off under reduced pressure. The crude diacetate may be purified, for example, by a wash with about 10% $NaHCO_3$ and by fractional distillation at reduced pressure.

Dihydromycrenyl monoacetate may be prepared from epoxytetrahydromyrcene by more than one reaction sequence. For example, the monoacetate may be obtained by hydroxylating-acetylating to obtain the hydroxy ester, then dehydroxylating. The aforementioned monoacetate may also be obtained by hydroxylating to obtain the glycol, acetylating to obtain the diester and deacetylating to obtain the monoester. Both of the indicated reaction sequences have been used successfully.

One mol of dihydromyrcene is reacted with from about 1 mol to about 2 mols of acetic acid, and from about 0.6 mol to about 1.0 mol of 40% peracetic acid (supplied by Buffalo-Electro-Chemical Co., Buffalo, N.Y.) at from about 20° C. to about 40° C. for from about 12 hours to about 48 hours to obtain the hydroxyester. A minor amount of sodium acetate and from about 1 mol to about 2.5 mols of acetic anhydride are added and the mixture heated at from about 110° C. to about 120° C. for from about 8 hours to about 16 hours. The acetic acid-acetic anhydride mixture is distilled off at reduced pressure. The reaction product is purified by fractional distillation under vacuum.

Alternatively, 0.8 mol of tetrahydromyrcenyl diacetate is heated at from about 200° C. to about 250° C. at atmospheric pressure while removing acetic acid, for example, through a packed column. The crude monoacetate may be purified by washing with about 10% $NaHCO_3$ and vacuum distillation.

The following examples are merely illustrative of the present invention and are not to be interpreted as restricting the scope thereof:

EXAMPLE I

Dihydromyrcene

In a two-liter flask equipped with an agitator, a gas dispersion tube, a thermometer, and a mercury seal was placed 1299 grams of redistilled myrcene No. 85 and 50 grams of Raney nickel, which had been washed with methanol followed by benzene. The mixture was warmed to 35° C., and hydrogen was introduced with cooling until the absorption rate was negligible and the index of refraction of the product at 20° C. approached 1.450 (7 hours). After the catalyst had been separated by filtration, 1310 grams of dihydromyrcene were obtained.

Analysis:

Sp. gr. at 25°/25° C. _____ 0.7783
$n_D^{20}$ _____ 1.450
Percent myrcene (U.V. adsorption) _____ 5.9
I.V. (iodine value) _____ 355

Yield:

$$\frac{1310 \times 100}{1299} = 100.8\% \text{ wt. on distilled myrcene}$$

Dihydromyrcene was obtained in comparable yields by hydrogenating crude myrcene No. 85 and rectifying the crude dihydromyrcene either by steam distillation or by vacuum distillation.

EXAMPLE II

Hydroxytetrahydromyrcenyl acetate 140 grams of dihydromyrcene, 200 grams of acetic acid, and 200 grams of benzene were placed in a one-liter, three-neck flask equipped with an agitator, a dropping funnel, and a water separator with a reflux condenser. The mixture was heated under reflux to 89° C., and a cool (20° C.) solution of 113 grams of 30% $H_2O_2$ in 100 grams of acetic acid was added gradually during a four-hour period with continuous removal of a water-acetic acid mixture from the separator. After the addition had been completed, the batch was agitated two more hours, and cooled. A negative $H_2O_2$ test was obtained.

196 grams of water-acetic acid mixture analyzing 50.7% acetic acid and 0.13% $H_2O_2$ were removed through the separator.

One gram of sodium acetate was added to the batch, and benzene and acetic acid were distilled off at 80 mm. pressure up to a pot temperature of 100° C., leaving a residue of 158 grams of crude hydroxytetrahydromyrcenyl acetate.

Yield:

$$\frac{158 \times 100}{140-29} = 142.4\%$$

by weight on dihydromyrcene consumed.

The recovered acetic acid-benzene mixture (440 grams) contained 29 grams of dihydromyrcene and may be reused in the process. Alternatively, the dihydromyrcene may be washed free of acetic acid, and the benzene may be removed by atmospheric distillation.

The aforementioned 158 grams of crude hydroxytetrahydromyrcenyl acetate was vacuum distilled through a 12″ column at 2 mm. and gave the following fractions:

(1) 11 grams light fractions, B.P. 34° C.–60° C.
(2) 19 grams dihydromyrcenyl monoacetate, B.P. 60° C.–85° C., $n_D^{20}$ 1.4588.
(3) 111 grams hydroxyacetate, B.P. 85° C.–110° C., $n_D^{20}$ 1.4458.

Fraction 1 was a mixture of dihydromyrcene and a ketone; fraction 2 was principally dihydromyrcenyl monoester with a small quantity of ketone; fraction 3 was hydroxyacetate analyzing S.V. (saponification value) 207.7; S.V. after acetylation 381.3; $n_D^{20}$ 1.4458; sp. gr. 25°/25° C. 0.9764.

Yield:

Dihydromyrcenyl monoacetate:

$$\frac{19 \times 100}{140-29} = 17.1\% \text{ wt. on dihydromyrcene consumed}$$

Hydroxyacetate:

$$\frac{111 \times 100}{140-29} = 100\% \text{ wt. on dihydromyrcene consumed}$$

EXAMPLE III

*Tetrahydromyrcenyl diacetate*

The above experiment was repeated to yield 175 grams hydroxytetrahydromyrcenyl acetate crude. 150 grams of acetic anhydride were added, and the batch was heated to 120° C. for 6 hours. 0.25 gram sodium acetate was added, and an acetic anhydride-acetic acid mixture (143 grams), containing some dihydromyrcene, was removed under reduced pressure. The residual crude diacetate, containing some acetic anhydride, was vacuum distilled through a 12″ column packed with glass helices under 2 mm. of pressure. The following fractions were obtained:

(1) 16 grams light fractions, B.P. 28° C.–58° C.,
(2) 18 grams dihydromyrcenyl monoacetate fractions, B.P. 58° C.–80° C.,
(3) 120 grams diacetate fractions, B.P. 80° C.–108° C.

Fraction 1 was a mixture of 44.5% acetic anhydride and 49.2% ketone calculated as $C_8H_{14}O$; fraction 2 was dihydromyrcenyl monoacetate, S.V. 279.4; fraction 3 was tetrahydromyrcenyl diacetate, S.V. 370.7, $n_D^{20}$ 1.4489, sp. gr. 25°/25° C. 0.9884.

Yield:

Dihydromyrcenyl monoacetate:

$$\frac{18 \times 100}{140 - 29} = 16.2\% \text{ wt. on dihydromyrcene consumed}$$

Diacetate:

$$\frac{120 \times 100}{111} = 108.1\% \text{ wt. on dihydromyrcene consumed}$$

EXAMPLE IV

*Tetrahydromyrcenyl diacetate*

400 grams of dihydromyrcene, 400 grams of acetic acid, and 2 cc. of 98% sulfuric acid were placed in a 2-liter, 3-neck flask, equipped with a thermometer, an agitator, a dropping funnel, and a condenser. While agitating the mixture, 102 grams of cold 90% $H_2O_2$ were introduced gradually over a 2½-hour period, keeping the temperature at 35° C. to 40° C. by cooling. The mixture was agitated an additional 12 hours at 40° C.; at which time the $H_2O_2$ content was negligible. 10 grams of sodium acetate were added; the temperature was gradually raised to 80° C. and the batch agitated at 80° C. for 2 hours.

The acetic acid was removed by distillation under reduced pressure (80 mm.) up to a pot temperature of 80° C., recovering approximately 260 grams of acetic acid and a residue of 530 grams of crude esters. The crude esters contained a substantial amount of hydroxyester which was acetylated by adding 300 grams of acetic anhydride and heating at 120° C. for 6 hours.

The acetic acid-acetic anhydride mixture was removed by distillation under reduced pressure (50 mm.) up to a temperature of 90° C., recovering 498 grams analyzing 72.5% acetic anhydride and 20% dihydromyrcene.

The crude was washed with 10% $NaHCO_3$ and vacuum distilled through a 12″ column packed with glass helices under 2–3 mm. pressure. The following fractions were obtained:

(1) 46 grams light fractions, B.P. 42° C.–59° C. (22% ketone as $C_8H_{14}O$ 15% monoacetate),
(2) 67 grams monoacetate, B.P. 59° C.–80° C. (90–95% monoacetate),
(3) 292 grams diacetate, B.P. 80° C.–118° C. (90–95% diacetate),
Residue 44 grams.

Yield:

Dihydromercenyl monoacetate:

$$\frac{67 + (46 \times .15)}{400 - (498 \times .2)} \times 100$$
$$= 24.6\% \text{ wt. on dihydromyrcene consumed}$$

Diacetate:

$$\frac{292 \times 100}{400 - (498 \times .2)}$$
$$= 97.3\% \text{ wt. on dihydromyrcene consumed}$$

EXAMPLE V

*Tetrahydromyrcenyl acetate*

200 grams of dihydromyrcene and 100 grams acetic acid were placed in a one-liter, 3-neck flask equipped with an agitator, a thermometer, a dropping funnel, and a reflux condenser. 181 grams of 40% peracetic acid (Buffalo Electro-Chemical Co.) were slowly fed into the agitated mixture at 35° C.–40° C. over a 2-hour period, while cooling to maintain the temperature. The batch was agitated an additional 12 hours, at which time the $H_2O_2$ content was negligible.

15 grams of sodium acetate and 300 grams of acetic anhydride were added and the mixture heated at 120° C. for 8 hours. The batch was distilled under reduced pressure (50 mm.) up to a pot temperature of 90° C., thus recovering 546 grams of acetic acid-acetic anhydride mixture containing 66.5 grams dihydromyrcene. The residue of esters was vacuum distilled through a 12″ column packed with glass helices under 2–3 mm. pressure. The following fractions were collected.

(1) 37 grams light fractions, B.P. 45° C.–60° C. (20% ketone as $C_8H_{14}O$, 50% monoacetate),
(2) 36 grams monoacetate, B.P. 60° C.–85° C. (98% monoacetate),
(3) 108 grams diacetate, B.P. 85° C.–112° C. (90% diacetate).

Yield:

Dihydromercenyl monoacetate:

$$\frac{36 + (37 \times .5) \times 100}{200 - 66.5}$$
$$= 40.8\% \text{ wt. on dihydromyrcene consumed}$$

Tetrahydromyrcenyl diacetate:

$$\frac{108 \times 100}{200 - 66.5} = 80.9\% \text{ wt. on dihydromyrcene consumed}$$

EXAMPLE VI

*Deacetylation of tetrahydromyrcenyl diacetate to dihydromyrcenyl monoacetate*

110 grams of tetrahydromyrcenyl diacetate were heated at 230° C.–240° C. at atmospheric pressure over a 3-hour period in a distilling flask, while removing 21 grams of acetic acid at 115° C.–120° C. through a short 6″ column packed with glass helices. The crude was washed neutral with 10% $NaHCO_3$ and vacuum distilled through a 24″ column. The following fractions were obtained:

| Fraction | Pot Temp., (° C.) | Vapor Temp., (° C.) | Wt., Grams | $n_D^{20}$ | Sp. Gr., 25°/25° C. |
|---|---|---|---|---|---|
| 1 | 85–89 | 40–59 | 1.0 | 1.4572 | |
| 2 | 94 | 60 | 8.0 | 1.4471 | 0.8818 |
| 3 | 100 | 60 | 16.0 | 1.4472 | 0.8942 |
| 4 | 110 | 65 | 17.0 | 1.4492 | 0.9130 |
| 5 | 117 | 75 | 26.0 | 1.4542 | 0.9579 |
| 6 | 119 | 85 | 3.0 | 1.4531 | |
| 7 | 130 | 90 | 2.0 | 1.4556 | |
| 8 | 230 | 110 | 8.0 | 1.4559 | |
| Residue | | | 5.0 | | |

Fractions 2, 3, 4, 5 and 6 are good monoacetates; fractions 7 and 8 are diacetate at 50% value; fraction 1 is lights at no value.

Yield:

$$\frac{70 \times 100}{110 - (10 \times .5)} = 66.7\%$$

Analysis:

Sp. gr. 25°/25° C _____ 0.9308
$n_D^{20}$ _____ 1.4504
S.V. _____ 278.3

EXAMPLE VII

Redistillation of monoacetates 254 grams of monoacetate obtained by combining the monoacetates from the diacetate preparation with that from the deacetylation of the diacetate were distilled under 2 mm. pressure, using a 24" column packed with glass helices.

| Fraction | Pot Temp. (°C.) | Vapor Temp. (°C.) | Wt., Grams | $n_D^{20}$ | Sp. Gr., 25°/25° C. |
|---|---|---|---|---|---|
| 1 | 78–85 | 27–45 | 13.0 | 1.4711 | |
| 2 | 87 | 50 | 4.5 | 1.4631 | |
| 3 | 88 | 55 | 5.5 | 1.4577 | 0.8839 (S.V.=238) |
| 4 | 90 | 57 | 9.5 | 1.4550 | |
| 5 | 91 | 59 | 9.0 | 1.4531 | |
| 6 | 92 | 59 | 12.0 | 1.4531 | |
| 7 | 93 | 60 | 7.0 | 1.4528 | |
| 8 | 93 | 60 | 8.0 | 1.4529 | |
| 9 | 94 | 60 | 7.0 | 1.4528 | |
| 10 | 94 | 60 | 5.5 | 1.4528 | 0.9063 (S.V.=281.3) |
| 11 | 102 | 62 | 34.5 | 1.4528 | |
| 12 | 110 | 68 | 20.0 | 1.4544 | |
| 13 | 114 | 72 | 12.5 | 1.4561 | |
| 14 | 115 | 77 | 16.0 | 1.4568 | |
| 15 | 117 | 80 | 10.0 | 1.4569 | |
| 16 | 120 | 80 | 12.0 | 1.4570 | 0.9488 (S.V.=301.9) |
| 17 | 122 | 89 | 11.0 | 1.4557 | |
| 18 | 125 | 90 | 10.0 | 1.4551 | |
| 19 | 125 | 92 | 11.0 | 1.4555 | |
| 20 | 125 | 94 | 8.0 | 1.4552 | |
| 21 | 129 | 97 | 8.0 | 1.4554 | |
| 22 | 132 | 100 | 8.0 | 1.4560 | 0.9685 (S.V.=369.8) |
| 23 | 137 | 102 | 6.0 | 1.4570 | |
| 24 | 170 | 105 | 6.0 | 1.4582 | |
| Residue | | | 6.0 | | |

Fractions 1 through 6 (53.5 grams) were bulked as light fractions at 80% value; fractions 7 through 18 (153.5 grams) as "B" material at 100% value; fractions 19 to 24 (47 grams) as diacetate fractions at 75% monoacetate value.

Yield:

$$\frac{(53.5 \times .8 + 153.5 + 47 \times .75) \times 100}{254} = 91.2\%$$ on crude monoacetates, $(16.2\% + (108.1\% \times .667)) .912 = 80.5\%$ wt. on dihydromyrcene.
$80.5\% \times .962 = 77.4\%$ wt. on myrcene No. 85.

Analysis:

Sp. gr. 25°/25° C _____ 0.9256
$n_D^{20}$ _____ 1.4513
S.V. _____ 278.5

EXAMPLE VIII

Saponification of monoacetate 130 grams of monoacetate were saponified by refluxing 5½ hours with a solution of 102 grams of 45% KOH dissolved in 100 grams of methanol. The methanol was then removed by atmospheric distillation up to a pot temperature of 100° C. The oil was taken up in 100 cc. of benzene and was washed neutral with water. When the benzene was removed under reduced pressure, a residue of 103 grams of crude alcohols was obtained. The aforementioned crude alcohols were vacuum distilled through a 24" column packed with glass helices under 3–4 mm. pressure.

| Fraction | Pot Temp. (°C.) | Vapor Temp. (°C.) | Wt. (Grams) | $n_D^{20}$ | Analysis |
|---|---|---|---|---|---|
| 1 | 84 | 63–68 | 2.0 | 1.4518 | Purity 73.3% (as Linalool). 98.0% (as Terpineol). Sp. Gr. 25°/25° C.—0.8943. $n_D^{20}$—1.4558. |
| 2 | 86 | 71 | 3.0 | 1.4538 | |
| 3 | 86 | 70 | 6.0 | 1.4565 | |
| 4 | 86 | 69 | 9.0 | 1.4579 | Purity 90.5% (as Linalool). 98.5% (as Terpineol). Sp. Gr. 25°/25° C.—0.8803. $n_D^{20}$—1.4609. S.V.—3.6. O.R.—2°0'. |
| 5 | 87 | 72 | 10.0 | 1.4581 | |
| 6 | 88 | 73 | 18.0 | 1.4599 | |
| 7 | 88 | 74 | 18.0 | 1.4618 | |
| 8 | 90 | 76 | 10.0 | 1.4632 | |
| 9 | 94 | 77 | 8.0 | 1.4651 | Purity 88.4% (as Linalool). 98.5% (as Terpineol). Sp. Gr. 25°/25° C.—0.8975. $n_D^{20}$—1.4684. S.V.—7.7. |
| 10 | 100 | 78 | 6.0 | 1.4670 | |
| 11 | 130 | 81 | 10.0 | 1.4705 | |
| Residue | | | 3.0 | | |

Yield of alcohols (fractions 1 through 11):

$$\frac{100 \times 100}{130} = 77\%$$ (wt. of alcohol from the monoacetates)

The products obtained according to the present invention are valuable in perfumery. They have unusual and natural odors.

Variations and modifications of the principles disclosed herein may be made without departing from the spirit of the present invention. Insofar as these variations and modifications are within the purview of the annexed claims, they are to be considered as part of the present invention.

I claim:

1. The process for preparing dihydromercenyl monoacetate, which comprises reacting dihydromyrcene with an epoxidizing agent in the presence of acetic acid at an elevated temperature to form hydroxytetrahydromyrcenyl acetate, reacting the latter with acetic anhydride at an elevated temperature, whereby tetrahydromercenyl diacetate is formed, and decomposing said diacetate by heat to form the desired dihydromercenyl monoacetate.

2. The process of claim 1, wherein hydrogen peroxide is the epoxidizing agent.

3. The process for preparing dihydromercenyl monoacetate, which comprises reacting about 1 mol of dihydromyrcene with about 1 mol of hydrogen peroxide in the presence of from about 1 mol to about 6 mols of acetic acid under reflux to form hydroxytetrahydromyrcenyl acetate, further reacting said hydroxytetrahydromyrcenyl acetate with from about 1 mol to about 2.5 mols of acetic anhydride at a temperature within the range from about 100° C. to about 120° C. to obtain a mixture of dihydromyrcenyl monoacetate and tetrahydromyrcenyl diacetate, removing and decomposing said diacetate by heating same at a temperature within the range from about 200° C. to about 250° C. to form dihydromyrcenyl monoacetate.

References Cited in the file of this patent

UNITED STATES PATENTS 2,062,918    Lawson _____ Dec. 1, 1936

(Other references on following page)

UNITED STATES PATENTS

| | | |
|---|---|---|
| 2,251,983 | Chitwood | Aug. 12, 1941 |
| 2,312,684 | Borglin | Mar. 2, 1943 |
| 2,773,895 | Ballard et al. | Dec. 11, 1956 |
| 2,871,271 | Booth | Jan. 27, 1959 |

OTHER REFERENCES

Heusler: Chem. of the Terpennes, P. Blakiston Co., Phila., 1902, p. 379.

Farmer et al.: J. Chem. Soc. (London), 1942, 148.

Bateman et al.: J. Chem. Soc. (London), 1950, 3056.

Simonsen: The Terpenes, vol. III, 2nd ed., 1952, p. 482.

Simonsen: The Terpenes, Cambridge U. Press, London, 1953, vol. I, 2nd ed., revised, pp. 9–19, 111–113.

Simonsen: The Terpenes, vol. I, 2nd ed., 1953, pp. 68–70.

UNITED STATES PATENT OFFICE
CERTIFICATION OF CORRECTION

Patent No. 3,005,019            October 17, 1961

Garry C. Kitchens

It is hereby certified that error appears in the above numbered patent requiring correction and that the said Letters Patent should read as corrected below.

Column 1, the extreme left-hand portion of the first formula, for "$CH_3=$" read -- $CH_2=$ --; column 2, line 24, for "hydroxytetrahydromyrcene" read -- hydroxytetrahydromyrcenyl --.

Signed and sealed this 10th day of April 1962.

(SEAL)
Attest:

ERNEST W. SWIDER            DAVID L. LADD
Attesting Officer            Commissioner of Patents